United States Patent
Barowski et al.

(10) Patent No.: US 8,984,314 B2
(45) Date of Patent: *Mar. 17, 2015

(54) CHARGE RECYCLING BETWEEN POWER DOMAINS OF INTEGRATED CIRCUITS

(71) Applicant: International Business Machines Corporation, Armonk, NY (US)

(72) Inventors: Harry Barowski, Boeblingen (DE); Joachim Keinert, Altdorf (DE); Antje Mueller, Boeblingen (DE); Tim Niggemeier, Laatzen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/083,887

(22) Filed: Nov. 19, 2013

(65) Prior Publication Data
US 2014/0082386 A1    Mar. 20, 2014

Related U.S. Application Data

(63) Continuation of application No. 13/307,915, filed on Nov. 30, 2011.

(51) Int. Cl.
*G06F 1/32* (2006.01)
*G06F 1/00* (2006.01)

(52) U.S. Cl.
CPC ............ *G06F 1/3234* (2013.01); *G06F 1/3287* (2013.01)
USPC .......................................... 713/320; 713/300

(58) Field of Classification Search
CPC .................................. G06F 1/3287; G06F 1/10
See application file for complete search history.

(56) References Cited

U.S. PATENT DOCUMENTS

| | | |
|---|---|---|
| 6,329,874 B1 | 12/2001 | Ye et al. |
| 7,138,825 B2 | 11/2006 | Kim et al. |
| 7,196,954 B2 | 3/2007 | Suh et al. |
| 7,414,460 B1 | 8/2008 | Lien et al. |
| 7,616,051 B2 | 11/2009 | Veendrick et al. |
| 7,913,141 B2 | 3/2011 | Yu et al. |
| 7,948,263 B2 | 5/2011 | Kim et al. |
| 2005/0127756 A1* | 6/2005 | Shepard et al. .................. 307/18 |
| 2009/0121780 A1* | 5/2009 | Chen et al. ..................... 327/536 |

(Continued)

OTHER PUBLICATIONS

U.S. Appl. No. 13/307,915.

(Continued)

*Primary Examiner* — Kim Huynh
*Assistant Examiner* — Joshua Neveln
(74) *Attorney, Agent, or Firm* — Francis Lammes; Stephen J. Walder, Jr.; Parashos T. Kalaitzis

(57) ABSTRACT

A mechanism is provided for efficiently recycling a charge from a power domain that is discharging. A side of a discharging power domain normally coupled to a voltage supply is disconnected from the voltage supply. The side of the precharging power domain normally coupled to the voltage supply is currently disconnected from the voltage supply. The side of the discharging power domain normally coupled to the voltage supply is connected to a side of the precharging power domain normally coupled to the voltage supply. A side of the discharging power domain normally coupled to the ground is disconnected from ground. The side of the discharging power domain normally coupled to ground is connected to the voltage supply, thereby precharging the precharging power domain with the charge from the discharging power domain that would normally be lost due to leakage.

6 Claims, 6 Drawing Sheets

(56) References Cited

U.S. PATENT DOCUMENTS

2009/0146734 A1 6/2009 Fallah et al.
2013/0138978 A1 5/2013 Barowski et al.

OTHER PUBLICATIONS

Pakbaznia, E. et al., "Charge Recycling in Power-Gated CMOS Circuits", IEEE Transactions on Computer-Aided Design of Integrated Circuits and Systems, http://ieeexplore.ieee.org/xpl/freeabs_all.jsp?arnumber=4627540, Abstract, vol. 27, Issue 10, Oct. 2008, 1 page.

Roy, S. et al., "A Framework for Power-Gating Functional Units in Embedded Microprocessors", IEEE Transactions on Very Large Scale Integration (VLSI) Systems, http://ieeexplore.ieee.org/xpls/abs_all.jsp?arnumber=4806137, Abstract, vol. 17, Issue 11, Nov. 2009, 1 page.

* cited by examiner

CHARGE RECYCLING BETWEEN POWER DOMAINS OF INTEGRATED CIRCUITS

BACKGROUND

The present application relates generally to an improved data processing apparatus and method and more specifically to mechanisms for recycling charge between power domains of integrated circuits.

Modern microprocessors comprise a wide variety of functional units that may function independently or together with other functional units and/or subsystems. Thus, a set of otherwise unrelated devices (functional units and/or subsystems) may share a same clock and/or power lines, thereby forming power domains. When a power domain is unused or not currently needed, the functional units and subsystems within the power domain continue to use power, which may be referred to as leakage power. One method to reduce leakage power is through power gating, where power domains that are unused or not needed are powered down, while the rest of the power domains within the microprocessor continue to function normally.

However, in order to power up these power domains after power down, the various functional units and subsystems of the power domain represent large capacitances that need to be charged before the functional units and other subsystems would be ready to be actively utilized. Further, any charge that exists in an active power domain may be lost after the power domain is once again power gated.

SUMMARY

In one illustrative embodiment, a method, in a data processing system, is provided for efficiently recycling a charge from a power domain that is discharging. The illustrative embodiment identifies the power domain that is discharging, thereby forming a discharging power domain, and a power domain that needs to be precharged, thereby forming a precharging power domain. The illustrative embodiment disconnects a side of the discharging power domain normally coupled to a voltage supply from the voltage supply. The illustrative embodiment connects the side of the discharging power domain normally coupled to the voltage supply to a side of the precharging power domain normally coupled to the voltage supply. In the illustrative embodiment, the side of the precharging power domain normally coupled to the voltage supply is currently disconnected from the voltage supply. The illustrative embodiment disconnects a side of the discharging power domain normally coupled to the ground from ground. The illustrative embodiment connects the side of the discharging power domain normally coupled to ground to the voltage supply, thereby precharging the precharging power domain with voltage from the discharging power domain that would normally be lost due to leakage.

In another illustrative embodiment, an apparatus is provided. The system/apparatus may comprise a discharging power domain and a precharging power domain. The apparatus may comprise a plurality of switches that perform various ones of, and combinations of, the operations outlined above with regard to the method illustrative embodiment.

In yet another illustrative embodiment, a processor is provided. The processor may comprise a discharging power domain and a precharging power domain. The apparatus may comprise a plurality of switches that perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
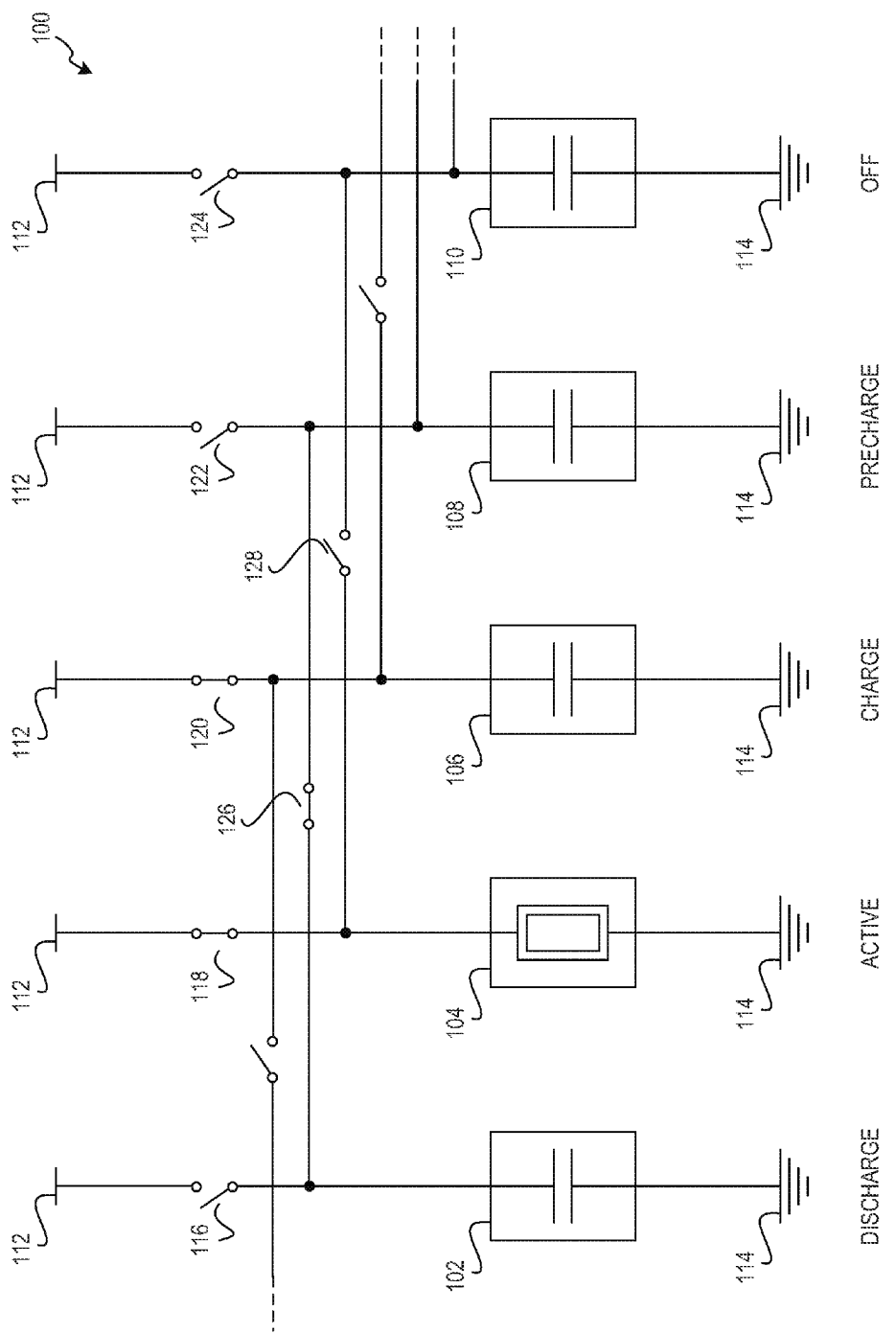
FIG. 1 illustrates one solution to take advantage of a discharging power domain in accordance with an illustrative embodiment.

As stated previously, power domains leak power when powered down through power gating or powered up for charging. FIG. 1 illustrates one solution to take advantage of a discharging power domain in accordance with an illustrative embodiment. Data processing system 100 comprises power domains 102, 104, 106, 108, and 110 that each represent independent groups of functional units and/or subsystems working together to execute instructions. Each of power domains 102, 104, 106, 108, and 110 are coupled to voltage supply (Vdd) 112 via switches 116, 118, 120, 122, and 124 and are directly coupled ground (Gnd) 114. In this example, each of power domains 102, 104, 106, 108, and 110 are in different states: power domain 102 in a discharge state, power domain 104 in an active state, power domain 106 in a charge state, power domain 108 in a precharge state, and power domain 110 in an off state.

In this example, in a current cycle, power domain 104 is directly coupled to voltage supply 112 by switch 118 being closed and power domain 104 is in an active state because the functional units and/or subsystems are actively working together to execute instructions, thus power domain 104 represents a resistive load. As is also shown, power domain 106 is directly coupled to voltage supply 112 by switch 120 closing and is in a charge state because the functional units and/or subsystems are ready to execute instructions but are not yet actively working together to execute instructions, thus power domain 106 also represents a capacitive load. In this example, in the previous cycle, power domain 102 just completed executing instructions and is disconnected from voltage supply 112 via switch 116 opening. Thus, the functional units within power domain 102 represent a capacitive load that is slowly discharging to ground 114. In order to take advantage of the capacitive load in power domain 102, switch 126 closes so that, rather than the capacitive charge in power domain 102 discharging to ground 114, a portion of the charge of power domain 102 is transferred to power domain 108, which is disconnected from voltage supply 112 by switch 122 being open, until the voltages in power domain 102 and 108 equalize.

In this example, in a next cycle, power domain 110, which is currently off, will switch to a precharge state. Therefore, similar to the previous description, in order to take advantage of what will be a capacitive load in power domain 104, switch 128 closes so that, rather than the capacitive charge discharging to ground S114, the portion of the charge will pass to power domain 110, which is disconnected from voltage supply 112 by switch 124 being open, until the voltages in power domain 104 and 110 equalize. In subsequent cycles, similar voltage recycling will occur.

However, issues exist with the configuration shown in FIG. 1. That is, when the voltages between power domains equalize, the charge transfer is finished and any remaining charge will be lost. Thus, only fifty percent of the charge from a discharging power domain can be reused with equal capacitances and without power leakage. In reality, the energy savings is significantly lowered because of transfer time and power leakage. Further, there is a long charge transfer time due to the fast decreasing potential difference during the charge transfer.

Thus, the present invention provides for a more efficient recycling of the charge between power domains of integrated circuits. With the mechanisms of the present invention, any residual charge residing in a discharging power domain is substantially transferred to a precharging power domain. Through the mechanisms of the illustrative embodiments, the precharging power domain may be charged at a faster rate with less power leakage loss and may require less energy from a power supply for final charging.

Figure 2:
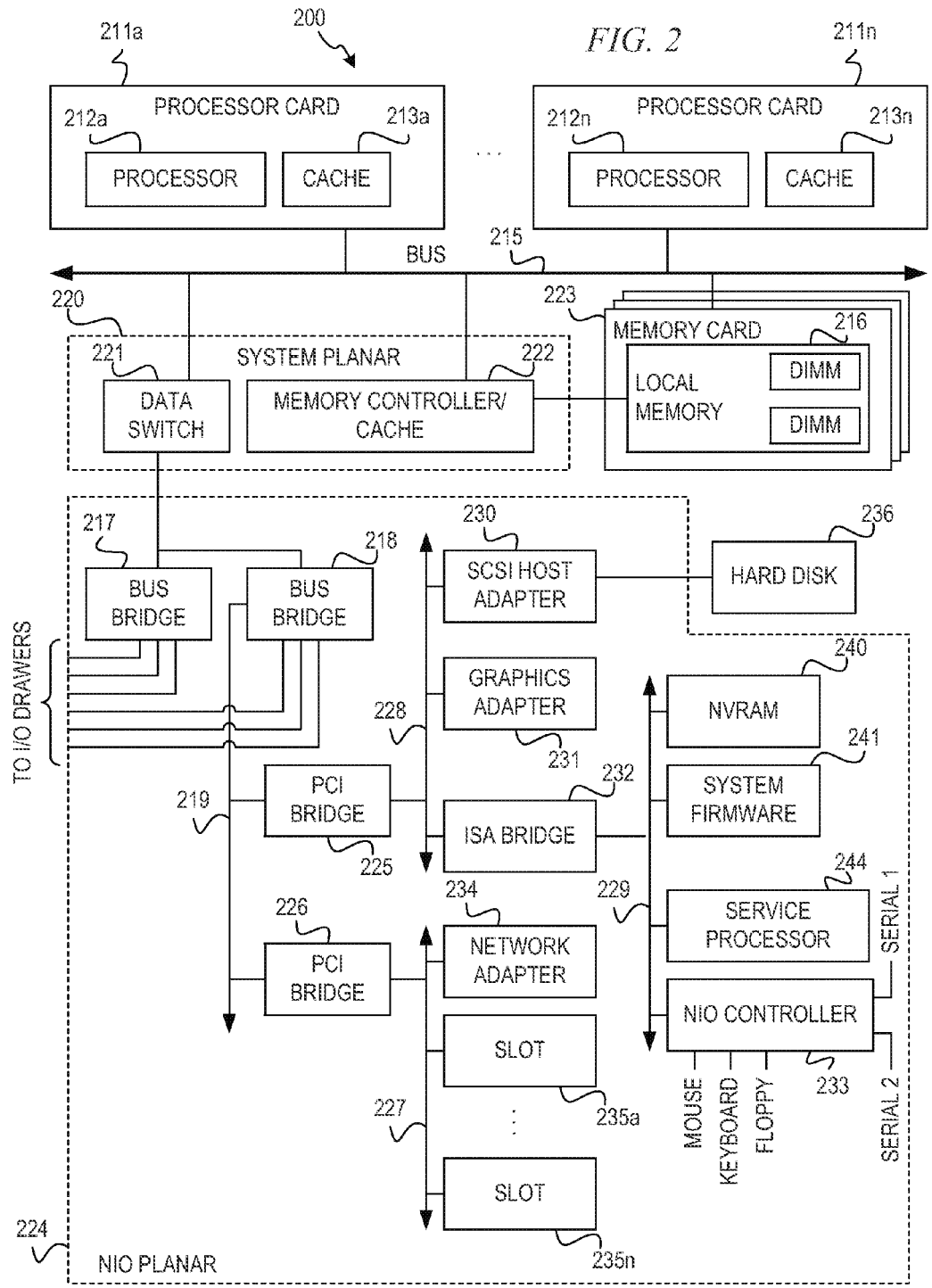
FIG. 2 depicts a block diagram of a data processing system with which aspects of the illustrative embodiments may advantageously be utilized.
Figure 3:
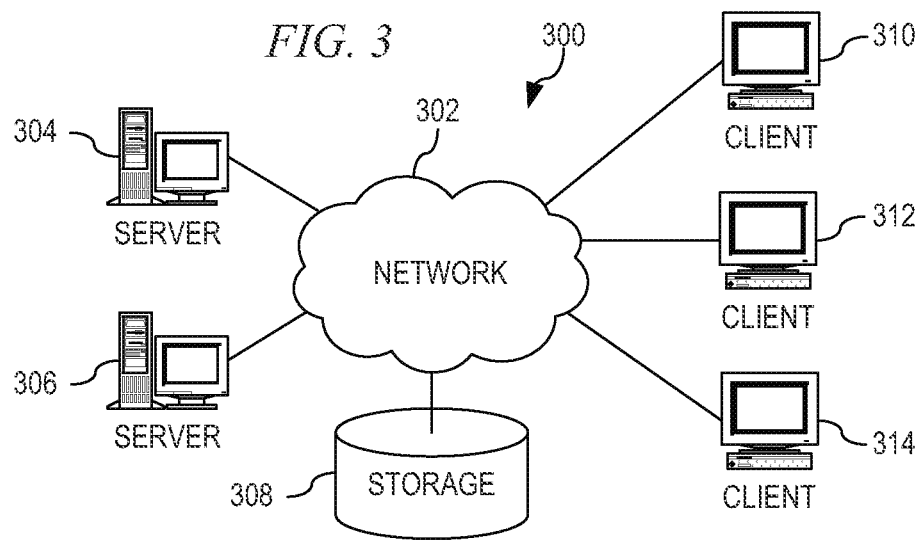
FIG. 3 depicts a pictorial representation of an example distributed data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 2 and 3 are provided hereafter as example environments in which aspects of the illustrative embodiments may be implemented. It should be appreciated that FIGS. 2 and 3 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a block diagram of a data processing system with which aspects of the illustrative embodiments may advantageously be utilized. As shown, data processing system 200 includes processor cards 211a-211n. Each of processor cards 211a-211n includes a processor and a cache memory. For example, processor card 211a contains processor 212a and cache memory 213a, and processor card 211n contains processor 212n and cache memory 213n.

Processor cards 211a-211n are connected to main bus 215. Main bus 215 supports a system planar 220 that contains processor cards 211a-211n and memory cards 223. The system planar also contains data switch 221 and memory controller/cache 222. Memory controller/cache 222 supports memory cards 123 that include local memory 216 having multiple dual in-line memory modules (DIMMs).

Data switch 221 connects to bus bridge 217 and bus bridge 218 located within a native I/O (NIO) planar 224. As shown, bus bridge 218 connects to peripheral components interconnect (PCI) bridges 225 and 226 via system bus 219. PCI bridge 225 connects to a variety of I/O devices via PCI bus 228. As shown, hard disk 236 may be connected to PCI bus 228 via small computer system interface (SCSI) host adapter 230. A graphics adapter 231 may be directly or indirectly connected to PCI bus 228. PCI bridge 226 provides connections for external data streams through network adapter 234 and adapter card slots 235a-235n via PCI bus 227.

An industry standard architecture (ISA) bus 229 connects to PCI bus 228 via ISA bridge 232. ISA bridge 232 provides interconnection capabilities through NIO controller 233 having serial connections Serial 1 and Serial 2. A floppy drive connection, keyboard connection, and mouse connection are provided by NIO controller 233 to allow data processing system 200 to accept data input from a user via a corresponding input device. In addition, non-volatile RAM (NVRAM) 240 provides a non-volatile memory for preserving certain types of data from system disruptions or system failures, such as power supply problems. A system firmware 241 is also connected to ISA bus 229 for implementing the initial Basic Input/Output System (BIOS) functions. A service processor 244 connects to ISA bus 229 to provide functionality for system diagnostics or system servicing.

The operating system (OS) is stored on hard disk 236, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 236, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 200 may be, for example, a stand-alone system or part of a network such as a local-area network (LAN) or a wide-area network (WAN).

FIG. 3 depicts a pictorial representation of an example distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, server 304 and server 306 connect to network 302 along with storage unit 308. In addition, clients 310, 312, and 314 also connect to network 302. These clients 310, 312, and 314 may be, for example, personal computers, network computers, or the like. In the depicted example, server 304 provides data, such as boot files, operating system images, and applications to the clients 310, 312, and 314. Clients 310, 312, and 314 are clients to server 304 in the depicted example. Distributed data processing system 300 may include additional servers, clients, and other devices not shown.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like.

Data processing system 200 in FIG. 2 may be a server, such as server 304 or server 306 in FIG. 3. Servers 304 and 306 may be capable of powering down and powering up one or more power domains, which are groups of functional units and/or subsystems within the server, depending on workload. That is, servers 304 and 306 save power by actively monitoring resource requirements of every partition and shutting down hardware within unused power domains.

Figure 4:
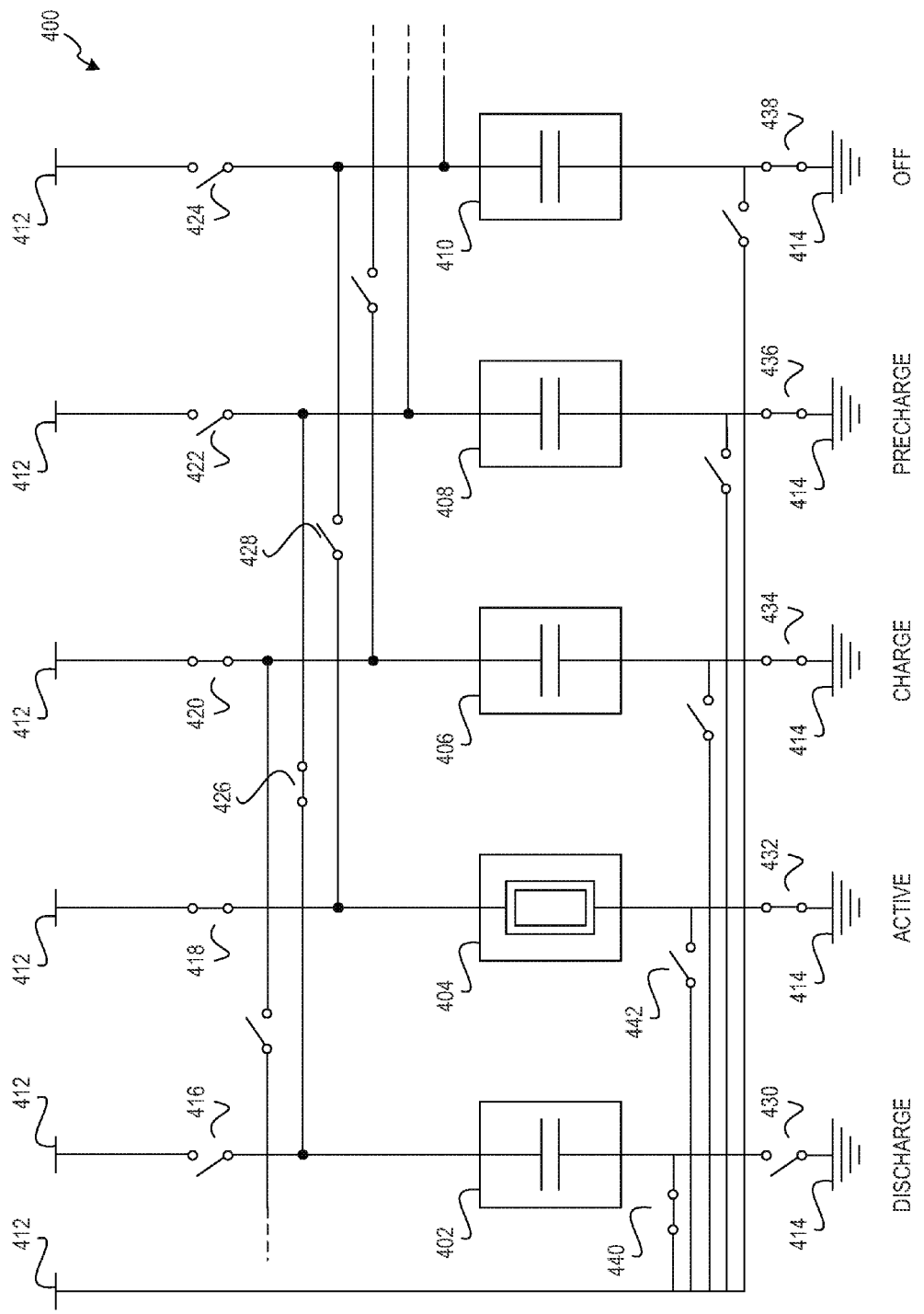
FIG. 4 depicts an exemplary mechanism for more efficient recycling of the charge between power domains of integrated circuits in accordance with an illustrative embodiment.

FIG. 4 depicts an exemplary mechanism for more efficient recycling of the charge between power domains of integrated circuits in accordance with an illustrative embodiment. Data processing system 400 comprises power domains 402, 404, 406, 408, and 410 that each represent independent groups of functional units and/or subsystems working together to execute instructions. Each of power domains 402, 404, 406, 408, and 410 are coupled to voltage supply (Vdd) 412 via switches 416, 418, 420, 422, and 424 and are coupled to ground (Gnd) 414 via switches 430, 432, 434, 436, and 438. In this example, each of power domains 402, 404, 406, 408, and 410 are in different states: power domain 402 in a discharge state, power domain 404 in an active state, power domain 406 in a charge state, power domain 408 in a precharge state, and power domain 410 in an off state.

In this example, in a current cycle, power domain 404 is directly coupled to voltage supply 412 by switch 418 still being closed and to ground 414 by switch 432 still being closed. Thus, power domain 404 is in an active state because the functional units and/or subsystems are actively working together to execute instructions, thus power domain 404 represents a resistive load. As is also shown, power domain 406 is directly coupled to voltage supply 412 by switch 420 being closed and to ground 414 by switch 434 being closed. Thus, power domain 406 is in a charge state because the functional units and/or subsystems are ready to execute instructions but are not yet actively working together to execute instructions, thus power domain 406 represents a capacitive load.

Also in this example, in the previous cycle, power domain 402 just completed executing instructions and is disconnected from voltage supply 412 via switch 416 opening. Thus, the functional units within power domain 402 represent a capacitive load that would slowly discharge to ground 414. In order to take full advantage of the capacitive load in power domain 402, the mechanisms of the illustrative embodiments open switch 430 and close switch 440 so that the normally ground side of the capacitive load in power domain 402 is now coupled to voltage supply 412. By connecting the side of the capacitive load in power domain 402 normally coupled to ground 414 to voltage supply 412, the potential of the capacitive load in power domain 402 is shifted thereby forcing the substantial charge on the side of the capacitive load of power domain 402 normally coupled to voltage supply 412 to be transferred to power domain 408 since switches 426 and 436 are closed. While switch 430 is still closed from the previous cycle, switch 426 may close prior to switch 440 closing and switch 430 opening so that the voltages in power domain 402 and 408 equalize. The substantial charge from power domain 402 precharges the side of the capacitive load in power domain 408 normally coupled to voltage supply 412, which is disconnected from voltage supply 412 by switch 422 being opened, because the other side of the capacitive load represented by power domain 408 is coupled to ground 414 by switch 436 being closed. By transferring the charge from power domain 402 to power domain 408 using the mechanisms of the illustrative embodiments, the charge of the capacitive load in power domain 402 becomes substantially zero with the potential shift by applying voltage supply 412 through switch 440.

In this example, in a next cycle, power domain 410, which is currently off, will switch to a precharge state. Therefore, similar to the previous description, in order to take advantage of what will be a capacitive load in power domain 404, the mechanisms of the illustrative embodiments close switch 442 so that the normally ground side of the capacitive load in power domain 404 is now coupled to voltage supply 412. By connecting the side of the capacitive load in power domain 404 normally coupled to ground 414 to voltage supply 412, the potential of the capacitive load in power domain 404 is shifted thereby forcing the substantial charge on the side of the capacitive load of power domain 404 normally coupled to voltage supply 412 to be transferred to power domain 410 since switches 428 and 438 will be closed. With switch 432 being closed, switches 428 and 438 may close prior to switch 442 closing and switch 432 opening so that the voltages in power domain 404 and 410 equalize. The substantial charge from power domain 404 precharges the side of the capacitive load in power domain 410 normally coupled to voltage supply 412, which is disconnected from voltage supply 412 by switch 424 being opened, because the other side of the capacitive load represented by power domain 410 is coupled to ground 414 by switch 438 being closed. By transferring the charge from power domain 404 to power domain 410 using the mechanisms of the illustrative embodiments, the capacitive load in power domain 404 becomes substantially zero with the potential shift by applying voltage supply 412 through switch 442. In subsequent cycles, similar voltage recycling will occur.

Figure 5:
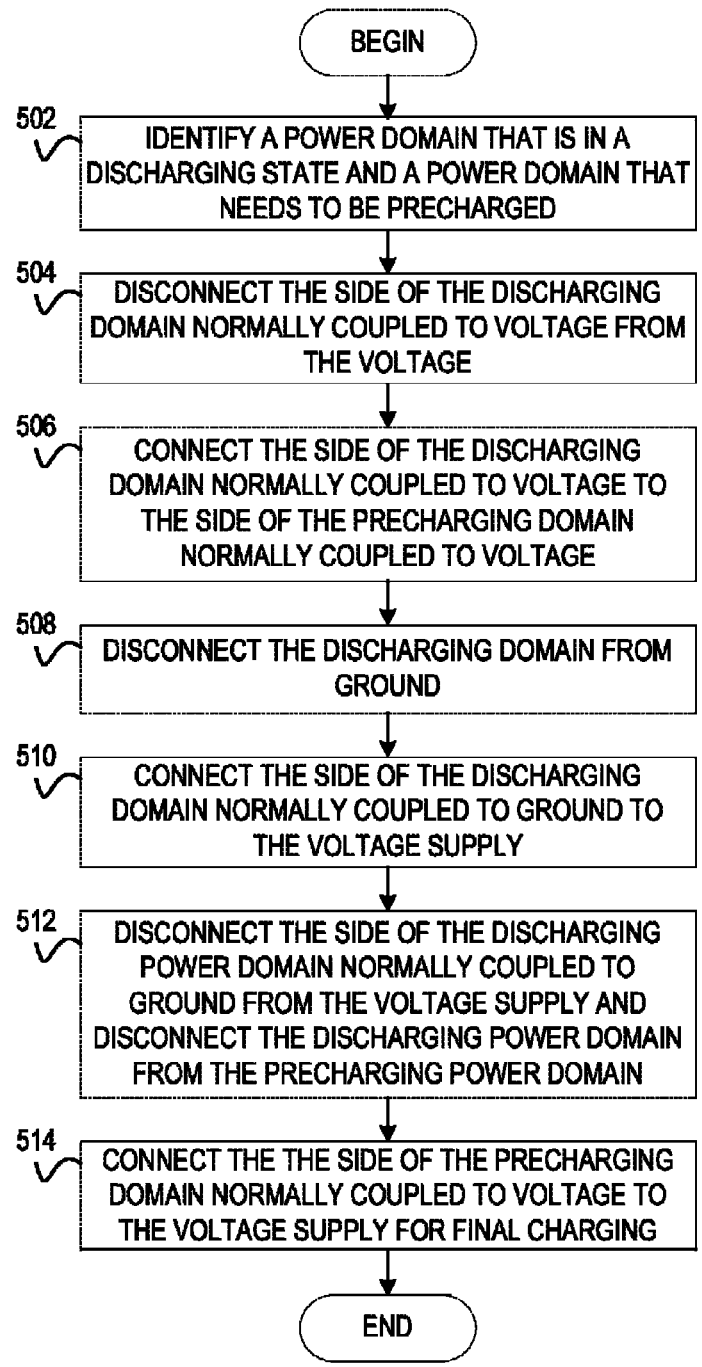
FIG. 5 depicts a flow diagram of the process performed by a charge recycling mechanism for efficient recycling of the charge between power domains of integrated circuits in accordance with an illustrative embodiment.

FIG. 5 depicts a flow diagram of the process performed by a charge recycling mechanism for efficient recycling of the charge between power domains of integrated circuits in accordance with an illustrative embodiment. As the operation begins, the charge recycling mechanism identifies a power domain that is in a discharging state and a power domain that needs to be precharged (step 502). The charge recycling mechanism disconnects the side of the discharging power domain normally coupled to the voltage supply from the voltage supply (step 504). The charge recycling mechanism then connects the side of the discharging power domain normally coupled to the voltage supply to the side of the precharging power domain normally coupled to the voltage supply, which is currently disconnected from the voltage supply (step 506). By connecting the discharging power domain to the precharging power domain the voltages in power domains equalize.

The charge recycling mechanism then disconnects the discharging power domain from ground (step 508). The charge recycling mechanism connects the side of the discharging power domain normally coupled to ground to the voltage supply (step 510). By connecting the side of the discharging power domain normally coupled to ground to the voltage supply, the potential of the capacitive load in discharging power domain is shifted thereby forcing the substantial charge on the side of the capacitive load of discharging power domain normally coupled to the voltage supply to be transferred to the precharging power domain. When the charge of the discharging power domain becomes substantially zero, the charge recycling mechanism disconnects the side of the discharging power domain normally coupled to ground from the voltage supply and, at substantially a same time, disconnects the discharging power domain from the precharging power domain (step 512). The charge recycling mechanism then connects the side of the precharging power domain normally coupled to the voltage supply to the voltage supply for final charging (step 514), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a more efficient recycling of the charge between power domains of integrated circuits. With the mechanisms of the present invention, any residual charge residing in a discharging power domain is substantially transferred to a precharging power domain. Through the mechanisms of the illustrative embodiments, the precharging power domain may be charge at a faster rate with less power leakage loss and may require less energy from a power supply for final charging.

Figure 6:
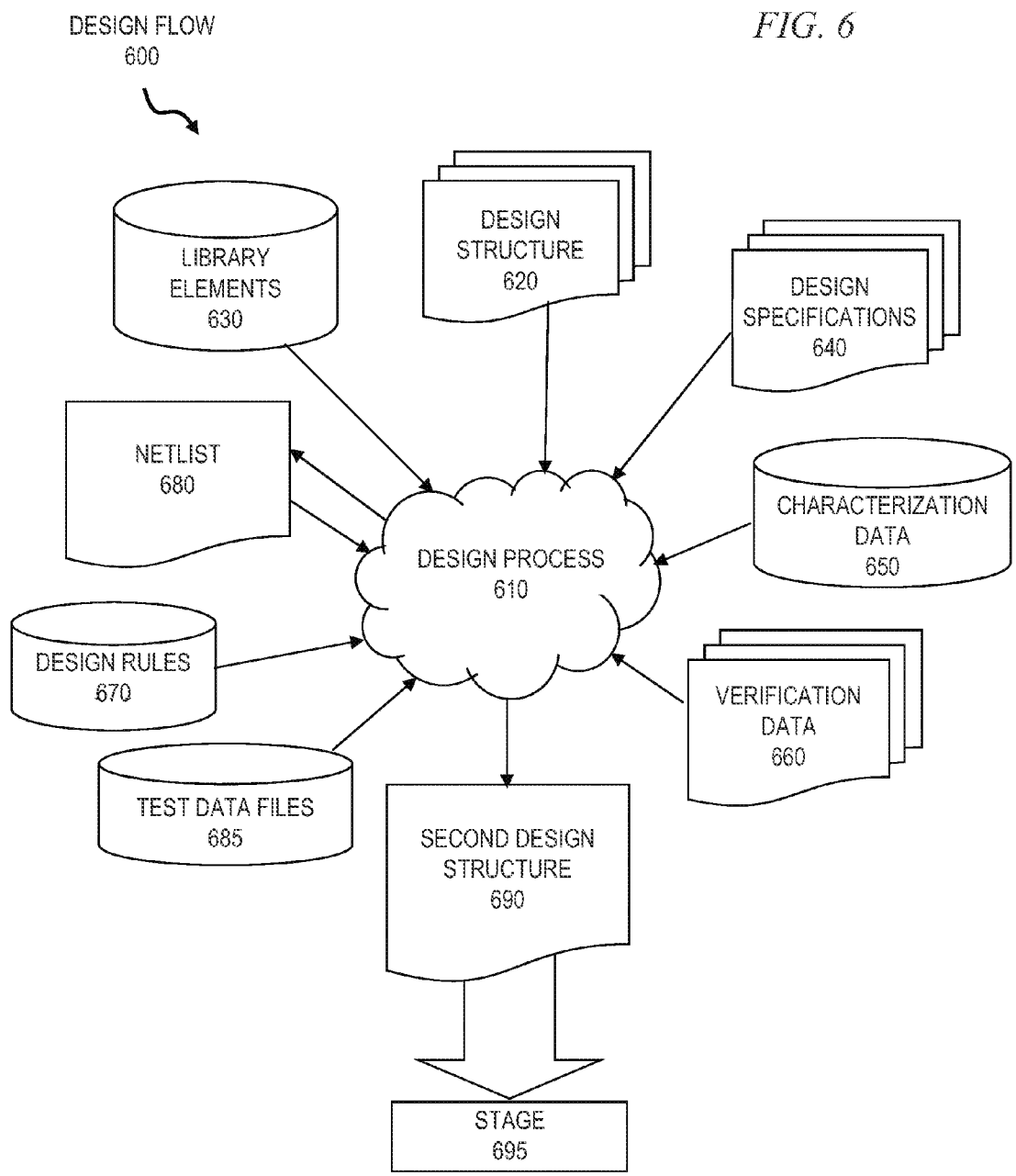
FIG. 6 shows a block diagram of an exemplary design flow used for example, in semiconductor design, manufacturing, and/or test.

FIG. 6 shows a block diagram of an exemplary design flow 600 used for example, in semiconductor design, manufacturing, and/or test. Design flow 600 may vary depending on the type of IC being designed. For example, a design flow 600 for building an application specific IC (ASIC) may differ from a design flow 600 for designing a standard component. Design structure 620 is preferably an input to a design process 610 and may come from an IP provider, a core developer, or other design company or may be generated by the operator of the design flow, or from other sources. Design structure 620 comprises an embodiment of the invention as shown in FIG. 1-5 in the form of schematics or HDL, a hardware-description language (e.g., Verilog, VHDL, C, etc.). Design structure 620 may be contained on one or more machine readable medium. For example, design structure 620 may be a text file or a graphical representation of an embodiment of the invention as shown in FIG. 1-5. Design process 610 preferably synthesizes (or translates) an embodiment of the invention as shown in FIG. 1-5 into a netlist 680, where netlist 680 is, for example, a list of wires, transistors, logic gates, control circuits, I/O, models, etc. that describes the connections to other elements and circuits in an integrated circuit design and recorded on at least one of machine readable medium. This may be an iterative process in which netlist 680 is resynthesized one or more times depending on design specifications and parameters for the circuit.

Design process 610 may include using a variety of inputs; for example, inputs from library elements 630 which may house a set of commonly used elements, circuits, and devices, including models, layouts, and symbolic representations, for a given manufacturing technology (e.g., different technology nodes, 32 nm, 45 nm, 90 nm, etc.), design specifications 640, characterization data 650, verification data 660, design rules 670, and test data files 685 (which may include test patterns and other testing information). Design process 610 may further include, for example, standard circuit design processes such as timing analysis, verification, design rule checking, place and route operations, etc. One of ordinary skill in the art of integrated circuit design can appreciate the extent of possible electronic design automation tools and applications used in design process 610 without deviating from the scope and spirit of the invention. The design structure of the invention is not limited to any specific design flow.

Design process 610 preferably translates an embodiment of the invention as shown in FIG. 1-5, along with any additional integrated circuit design or data (if applicable), into a second design structure 690. Design structure 690 resides on a storage medium in a data format used for the exchange of layout data of integrated circuits (e.g. information stored in a GDSII (GDS2), GL1, OASIS, or any other suitable format for storing such design structures). Design structure 690 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIG. 1-5. Design structure 690 may then proceed to a stage 695 where, for example, design structure 690: proceeds to tape-out, is released to manufacturing, is released to a mask house, is sent to another design house, is sent back to the customer, etc.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, for efficiently recycling a charge from a power domain that is discharging, the method:
   identifying the power domain that is discharging, thereby forming a discharging power domain, and a power domain that needs to be precharged, thereby forming a precharging power domain;
   disconnecting a side of the discharging power domain normally coupled to a voltage supply from the voltage supply;
   connecting the side of the discharging power domain normally coupled to the voltage supply to a side of the precharging power domain normally coupled to the voltage supply, wherein the side of the precharging power domain normally coupled to the voltage supply is currently disconnected from the voltage supply;
   disconnecting a side of the discharging power domain normally coupled to the ground from ground; and
   connecting the side of the discharging power domain normally coupled to ground to the voltage supply, thereby precharging the precharging power domain with the charge from the discharging power domain that would normally be lost due to leakage by shifting a potential of a capacitive load in the discharging power domain thereby forcing the charge on the side of the discharging power domain normally coupled to the voltage supply to transfer to the side of the precharging power domain normally coupled to the voltage supply.

2. The method of claim 1, further comprising:
   responsive to the charge on the side of the discharging power domain normally coupled to the voltage supply transferring to the side of the precharging power domain normally coupled to the voltage supply, disconnecting the side of the discharging power domain normally coupled to ground from the voltage supply;
   disconnecting the discharging power domain from the precharging power domain; and
   connecting the side of the precharging power domain normally coupled to the voltage supply to the voltage supply for final charging.

3. The method of claim 1, wherein a determination as to whether the charge on the side of the discharging power domain normally coupled to the voltage supply has completely transferred to the side of the precharging power domain normally coupled to the voltage supply is made when the charge on the side of the discharging power domain normally coupled to the voltage supply is substantially zero.

4. The method of claim 1, wherein, prior to disconnecting the side of the discharging power domain normally coupled to the ground from the ground, the voltages of the discharging power domain and the precharging power domain are allowed to equalize.

5. The method of claim 1, wherein the discharging power domain and the precharging power domain are a subset of power domains in a set of power domains and wherein the method is repeated in a cycle for each of a set of discharging power domain and precharging power domain in the set of power domains.

6. The method of claim 1, wherein the discharging power domain and the precharging power domain each represent an independent group of functional units working together to execute instructions in the data processing system.

* * * * *